UNITED STATES PATENT OFFICE.

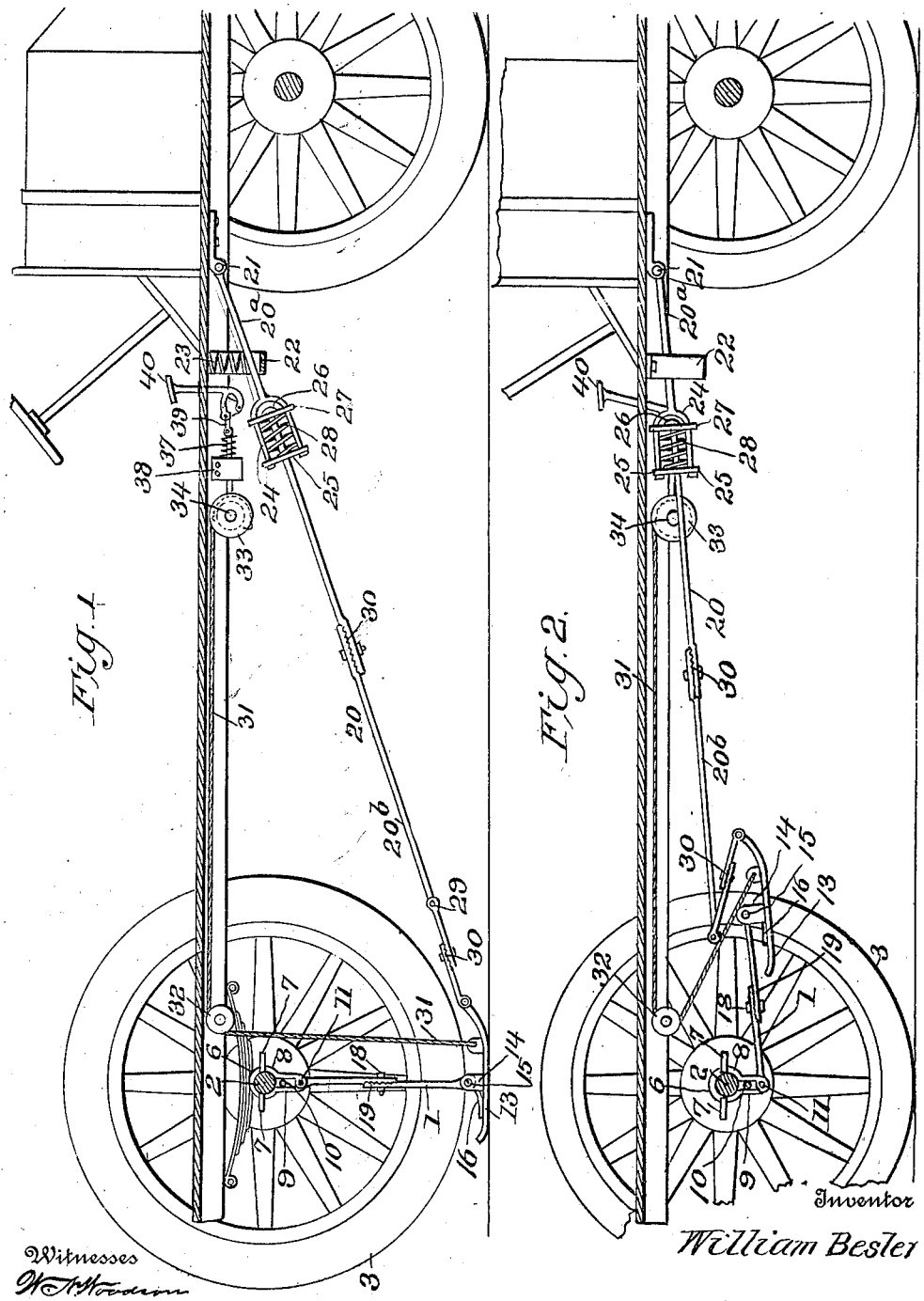

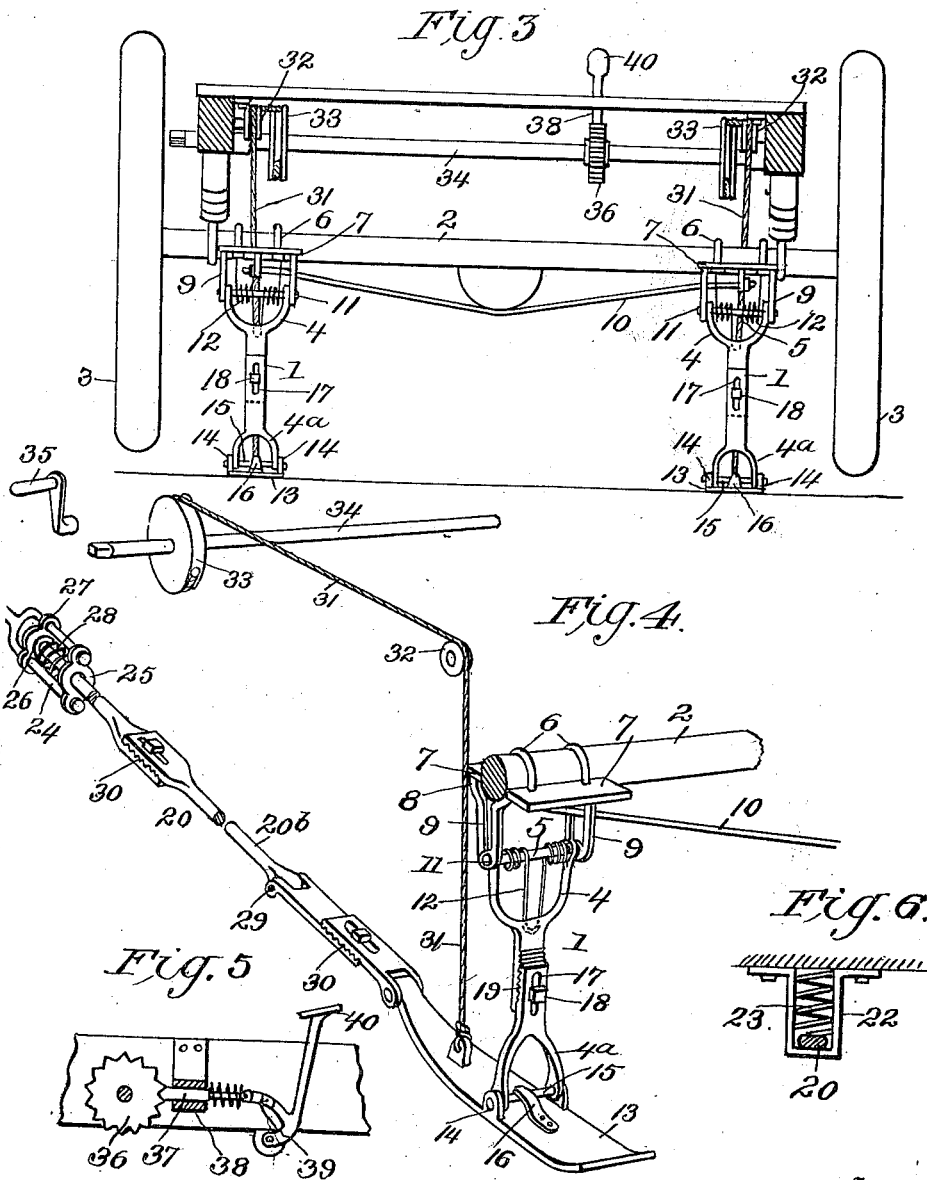

WILLIAM BESLER, OF COLOMA STATION, WISCONSIN.

AUTOMOBILE-BRAKE.

1,004,733.  Specification of Letters Patent.  Patented Oct. 3, 1911.

Application filed February 18, 1910. Serial No. 544,698.

*To all whom it may concern:*

Be it known that I, WILLIAM BESLER, citizen of the United States, residing at Coloma Station, in the county of Waushara and State of Wisconsin, have invented certain new and useful Improvements in Automobile-Brakes, of which the following is a specification.

The present invention comprehends certain new and useful improvements in brakes for automobiles and other vehicles, and the invention has for its object a particularly efficient emergency brake which is entirely independent of the propelling mechanism of the vehicle and which is adapted to quickly bring the vehicle to a standstill without the liability of injury to such propelling mechanism, or of undue wear on the tires.
A further object of the invention is a brake that is susceptible of being conveniently operated and that is positive in action and always ready for immediate use.

A still further object of the invention is a brake including legs which are provided with brake shoes and which are adapted to be swung to operative positions beneath the vehicle, so as to lift the drive wheels off the ground and to cause the vehicle to skid along on the brake shoes.

With these and other objects in view that will more fully appear as the description proceeds, the invention consists in certain constructions and arrangements of the parts that I shall hereinafter fully describe and then point out the novel features of in the appended claims.

For a full understanding of the invention and the merits thereof and also to acquire a knowledge of the details of construction, reference is to be had to the following description and accompanying drawings, in which:

Figure 1 is a longitudinal section of an automobile equipped with my improved brake, the brake being shown in operative position. Fig. 2 is a similar view showing the brake in inoperative position. Fig. 3 is a rear end view partly in section. Fig. 4 is a fragmentary perspective view of a part of a brake mechanism. Fig. 5 is a detail view of the releasing lever and the parts coöperating therewith, and Fig. 6 is a similar view showing one of the brace-rods mounted in the corresponding guide member.

Corresponding and like parts are referred to in the following description and indicated in all the views of the drawings by the same reference characters.

The present invention consists essentially in the provision of a pair of legs 1 which are suspended from the rear axle 2 of the automobile in proximity to the respective drive wheels 3. It is to be understood, however, that I do not limit myself to connecting the legs to the rear axle, but if desired, may attach them to any suitable adjacent portion of the vehicle. The legs are pivotally mounted to swing in vertical longitudinal planes and are spring-pressed into operative positions wherein they extend substantially vertically beneath the vehicle.

As the legs and parts coöperating therewith are substantial duplicates in structure, only one of the same will be specifically described. The leg is substantially straight and is similarly bifurcated at its opposite ends, as indicated at 4 and 4ᵃ. The bifurcations 4 are pivotally mounted on a pintle 5 which is disposed beneath the axle and in the direction thereof and forms part of an axle clip. In its preferred construction, this clip includes a pair of inverted U-shaped clip bolts 6 which straddle the axle; the corresponding ends of the clip bolts being detachably secured to spaced tie bars 7 extending on opposite sides of the axle. The tie bars are connected by cross bars 8, the end portions of which conform to the contour of and fit against the axle. Intermediate of their ends the cross bars are bowed downwardly in spaced relation to the axle, as indicated at 9, in order to embrace the usual truss bar that reinforces the axle. The bowed portions are formed with pivot joints 11 that are established through the medium of the pintle 5 which extends between and is supported by the cross bars, the pivot joints permitting the cross bars to be drawn into more effectual engagement with the axle. A coil spring 12 encircles the pintle between the pivot joints 11 and is extended to bear against the leg to tend to swing the same into operative position.

Disposed at the free end of the leg is a shoe 13 that is in the form of an elongated metallic plate which is disposed longitudinally with respect to the vehicle and is slightly upturned at its forward end, as shown. Intermediate of its ends the shoe is formed with a pair of transversely alining ears 14 to which the bifurcations 4ᵃ are pivotally connected through the medium of a transverse bolt 15. A flat spring 16 is preferably secured upon the shoe between the ears and engages the bolt to hold the same against relative turning movement.

The leg is divided intermediate of its ends to form separate sections, the adjacent ends of which overlap and are formed with registering longitudinal slots 17, a bolt 18 being passed through the slots to connect the sections together. The abutting faces of the sections are formed with series of transverse serrations 19 which are held in interlocking relation by tightening the bolt 18. By virtue of this arrangement the leg is rendered susceptible of accurate longitudinal adjustment, so that its length is greater than the distance of the pintle 5 above the ground, this being necessary in order to cause the shoe to contact with the ground in the operative position of the leg. Although this particular form of coupling between the leg sections is preferred, it is to be understood that any approved extension coupling may be employed in its stead.

A brace rod 20 extends longitudinally beneath the vehicle and is hinged at its forward end, as indicated at 21, beneath the body of the vehicle, or to any adjacent stationary portion thereof, the hinge connection permitting the brace rod to swing in vertical longitudinal plane. At its rear end the brace rod is pivotally connected to the forward end of the shoe 13. The brace rod operates in proximity to its forward end in a slotted guide member 22 that is secured to and depends from the vehicle body. A coil expansion spring 23 is mounted within the guide member and bears upon the brace rod to tend to swing the same downwardly, whereby to assist the spring 12 to move the parts of the brake into operative position. The primary function of the brace rod is to prevent the leg from swinging rearwardly past a center when in its operative position. Intermediate of its ends the brace rod is divided to form front and rear sections 20ª and 20ᵇ, the section 20ª being formed at its rear end with a substantially U-shaped yoke 24, the ends of which are connected by a gland 25 that coöperates with the yoke to constitute a framelike housing. The section 20ᵇ is slidable longitudinally through the gland and is provided within the yoke with a head 26. A washer 27 is preferably mounted on the section 20ᵇ in abutting relation to the head 26 and is slidably connected to the arms of the yoke. Encircling the section 20ᵇ between the washer and the gland, is an expansion spring 28, the spring affording the sections a limited relative longitudinal movement which is manifestly desirable in order to relieve the brace rod of undue strain. Another advantage attained with this particular form of coupling between the sections, is that excessive jar and vibration is absorbed in the operation of the brake. The section 20ᵇ is formed in spaced relation to its rear end with a pivot joint 29 that renders the rear portion of the brace rod capable of being folded forwardly so as not to interfere with the upward and forward swinging movement of the leg. On both sides of the pivot joint the brace rod is preferably constructed with extension couplings 30 to increase the scope of adjustment of the parts, the extension couplings being substantially similar to the coupling between the sections of the leg.

Each leg is controlled by a cable 31 which is preferably secured at one end to the shoe 13 in front of the pair of ears 14. The cable passes upwardly and forwardly through suitable guides 32 mounted on the body of the vehicle, and is attached at its forward end to a pulley 33 fixed on a shaft 34 which is journaled transversely of the vehicle body. There are two pulleys 33, so that a separate pulley is provided for each cable, the pulleys being mounted on the shaft in proximity to the opposite ends thereof. A removable crank handle 35 is fitted to one extremity of the shaft to admit of the pulleys being conveniently rotated to wind the cables thereon and thus simultaneously swing the legs upwardly into inoperative positions wherein they extend substantially horizontally forwardly from the axle and are folded beneath the vehicle, so as to be entirely out of the way and to clear any obstacles in the road (see Fig. 2). The shaft is held against rotation in the opposite direction through the instrumentality of a ratchet wheel 36 that is fixed thereon and is engaged by a spring-pressed detent 37. The detent is slidably mounted in a housing 38 secured to the bottom of the vehicle. A link 39 connects the detent with a releasing lever 40, that in the present instance, is designed to be operated by the foot and projects through the bottom of the vehicle body in convenient reach to the driver's seat.

Before describing the operation of my improved brake, it will be assumed that the parts are in inoperative position, as illustrated in Fig. 2. In case it becomes necessary to apply the emergency brake, the operator of the automobile merely places his foot upon the releasing lever 40, whereby to retract the detent 37 from engagement with the ratchet wheel and thus release the shaft. The cables are then permitted to unwind and the legs are swung downwardly and rearwardly under the influence of the springs 12, the brace rods unfolding and swinging downwardly with the legs to prevent the same from swinging rearwardly past a vertical position. The parts then assume the positions illustrated in Fig. 1. Inasmuch as the legs are greater in length than the distance of their pivotal points above the ground, the drive wheels 3 are lifted slightly above the ground and the automobile skids forwardly on the shoes 13. The frictional contact of the shoes with the ground overcomes the momentum of the vehicle, so that the same is quickly brought to a standstill.

Attention is particularly directed to the fact that as the operation of the brake is entirely independent of the propelling mechanism of the automobile, the machine can be stopped regardless of accidents to the machinery, such as failure of the clutches to act. By elevating the drive wheels above the ground, the tires are relieved of excessive wear.

The brake is conveniently returned to an inoperative position by rotating the shaft 34 to wind the cables 31 on the pulleys 33. This, of course, restores the rear wheels upon the ground, so as to admit of the automobile being again set in motion.

From the foregoing description in connection with the accompanying drawings it will be apparent that I have provided an improved brake which may be successfully employed in connection with automobiles and other motor driven vehicles; which is positive and efficient in action; and which is comparatively simple and durable in construction and is not likely to get out of repair.

Having thus described the invention what is claimed as new is:

1. In a vehicle brake, the combination of a shoe adapted for engagement with the ground, a swinging leg pendent from the vehicle and having the shoe pivotally connected to the lower end thereof, the said leg being normally swung upwardly and forwardly to hold the shoe in an inoperative position, a forwardly extending brace rod pivotally connected at its extremities to the shoe and some stationary part of the vehicle, the said brace rod being longitudinally extensible and being formed in sections which are yieldably connected, the rear end of the brace rod being hinged so as to fold back upon itself when the leg is swung upwardly to hold the shoe in inoperative position, and means for normally holding the shoe in inoperative position.

2. In a vehicle brake, the combination of a shoe adapted for engagement with the ground, a swinging leg pendent from the vehicle and having the shoe pivotally connected to the lower end thereof, the said leg being normally swung upwardly and forwardly to hold the shoe in inoperative position, a forwardly extending brace rod pivotally connected at its extremities to the shoe and some stationary part of the vehicle, the said brace rod serving to limit the rearward movement of the shoe when it is swung downwardly into operative position and the rear end of the brace rod being hinged so as to fold back upon itself when the leg is swung upwardly to hold the shoe in inoperative position, a keeper pendent from the vehicle and receiving the brace rod, a spring arranged within the keeper and normally tending to move the brace rod downwardly, and means for normally holding the shoe in inoperative position.

In testimony whereof I affix my signature in presence of two witnesses.

WILLIAM BESLER. [L. S.]

Witnesses:
 HARRY POWELL,
 ED. PRIM.